(12) United States Patent
Govindaraj

(10) Patent No.: US 6,266,808 B1
(45) Date of Patent: *Jul. 24, 2001

(54) COMPUTER PROGRAM PRODUCT FOR ENABLING THE CONSTRUCTION OF DIALOGS FOR COMMANDS AND TEMPLATES

(75) Inventor: Naresh K. Govindaraj, San Jose, CA (US)

(73) Assignee: International Business Machines Corporation, Armonk, NY (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/465,237

(22) Filed: Jun. 5, 1995

(51) Int. Cl.[7] .................................................. G06F 9/44

(52) U.S. Cl. ..................................... 717/7; 717/2; 717/3

(58) Field of Search ....................... 395/340, 339, 395/326, 332, 966, 347, 702, 350, 334, 341; 345/326, 331, 392, 347, 961, 968, 340, 341, 342, 394, 352, 353, 354, 348, 349; 717/1

(56) References Cited

U.S. PATENT DOCUMENTS

| | | |
|---|---|---|
| 4,742,467 | 5/1988 | Messerich et al. ................ 364/200 |
| 4,791,550 | 12/1988 | Stevenson et al. ................ 364/200 |
| 4,845,665 * | 7/1989 | Heath et al. ...................... 395/333 |
| 4,860,204 | 8/1989 | Gendron et al. .................. 364/300 |
| 5,202,828 * | 4/1993 | Vertelney et al. ................ 395/332 |
| 5,295,222 | 3/1994 | Wadhwa et al. ..................... 395/1 |
| 5,321,804 | 6/1994 | Kusaba et al. .................... 395/161 |
| 5,341,478 | 8/1994 | Travis, Jr. et al. ................ 395/200 |

(List continued on next page.)

OTHER PUBLICATIONS

IBM Dictionary of Computing, Public meaning of term JCL, pp. 363, Dec. 1993.*
Forte Tool Reference Manual Tool whole manual, Jun. 1994.*
Forte Workshop Manual Whole Manual, Jun. 1994.*
Forte System manual whole manual, Jun. 1994.*
Windows 3 Secrets, Brian Livingston Chapter 5, 1991.*
Inside Windows File Formats, Tom Swan Chapter 14, 1993.*

(List continued on next page.)

Primary Examiner—Mark R. Powell
Assistant Examiner—Todd Ingberg
(74) Attorney, Agent, or Firm—Sterne, Kessler, Goldstein & Fox P.L.L.C.

(57) ABSTRACT

A system and method for facilitating the construction of computer programs. The system enables an administrator to define dialogs associated with commands from a computer programming language. Users construct computer programs by using the dialogs. In particular, an user invokes a dialog. Code corresponding to a command associated with the invoked dialog is then automatically generated. The code is in a form and has a syntax defined by the computer programming language. The code is inserted into the computer program being constructed. Computer programs can also be constructed using dialogs and objects. In particular, a plurality of objects each corresponding to a resource in a target environment are defined and instantiated from a plurality of object classes. At least one of the dialogs is associated with each of the objects. An operator selects one or more of the objects (representing the resources in a system), and invokes a dialog associated with the selected objects. The system generates code that, when executed, applies a command associated with the invoked dialog to each of the selected objects. The code is in a form and has a syntax defined by the computer programming language. This code is inserted in the computer program being constructed.

25 Claims, 12 Drawing Sheets

U.S. PATENT DOCUMENTS

| | | | | |
|---|---|---|---|---|
| 5,388,203 | * | 2/1995 | Kaneko | 395/33 X |
| 5,404,441 | | 4/1995 | Satoyama | 395/155 |
| 5,465,362 | | 11/1995 | Orton et al. | 395/700 |
| 5,481,712 | | 1/1996 | Silver et al. | 395/700 |
| 5,481,718 | | 1/1996 | Ryu et al. | 395/700 |
| 5,517,606 | | 5/1996 | Matheny et al. | 395/156 |
| 5,530,864 | | 6/1996 | Matheny et al. | 395/700 |
| 5,537,630 | * | 7/1996 | Berry et al. | 345/347 |
| 5,542,024 | * | 7/1996 | Balint et al. | 395/333 |
| 5,555,365 | * | 9/1996 | Selby et al. | 345/335 |
| 5,555,370 | | 9/1996 | Li et al. | 395/161 |
| 5,559,946 | * | 9/1996 | Porter | 345/349 |
| 5,566,294 | | 10/1996 | Kojima et al. | 395/159 |
| 5,603,034 | | 2/1997 | Swanson | 395/701 |
| 5,682,535 | | 10/1997 | Knudsen | 395/701 |
| 5,710,926 | | 1/1998 | Maurer | 395/701 |

OTHER PUBLICATIONS

Inside Windows 3.1 Boyce et al p. 110, Chapter 8, 1992.*

The Windows Interface Guidelines for Software Design, Microsoft Press Chapter 11, 1995.*

Gordon, E., "Rational's Rose for Windows, Version 1.0.7: Straightforward Design Analysis Tool For The PC", *Application Development Trends,* Jan. 1994, pp. 76–77.

Bragg, T., "Smelling Like a rose", *Computer Language,* Mar. 1993, pp. 85–91.

Goddard, D., "A rose is a rose", *Data Based Advisor,* Mar. 1995, vol. 13, No. 3, p. 144(3).

Weeks, K., "The Sweet Smell of C++", *Windows Tech Journal,* Sep. 1994, pp. 69–72.

"Reference vol. I, Class Library Reference for the Microsoft Foundation Class Library," *Microsoft Visual C++*, Microsoft Corporation, Copyright 1993, pp. 95–120 and 328–337.

* cited by examiner

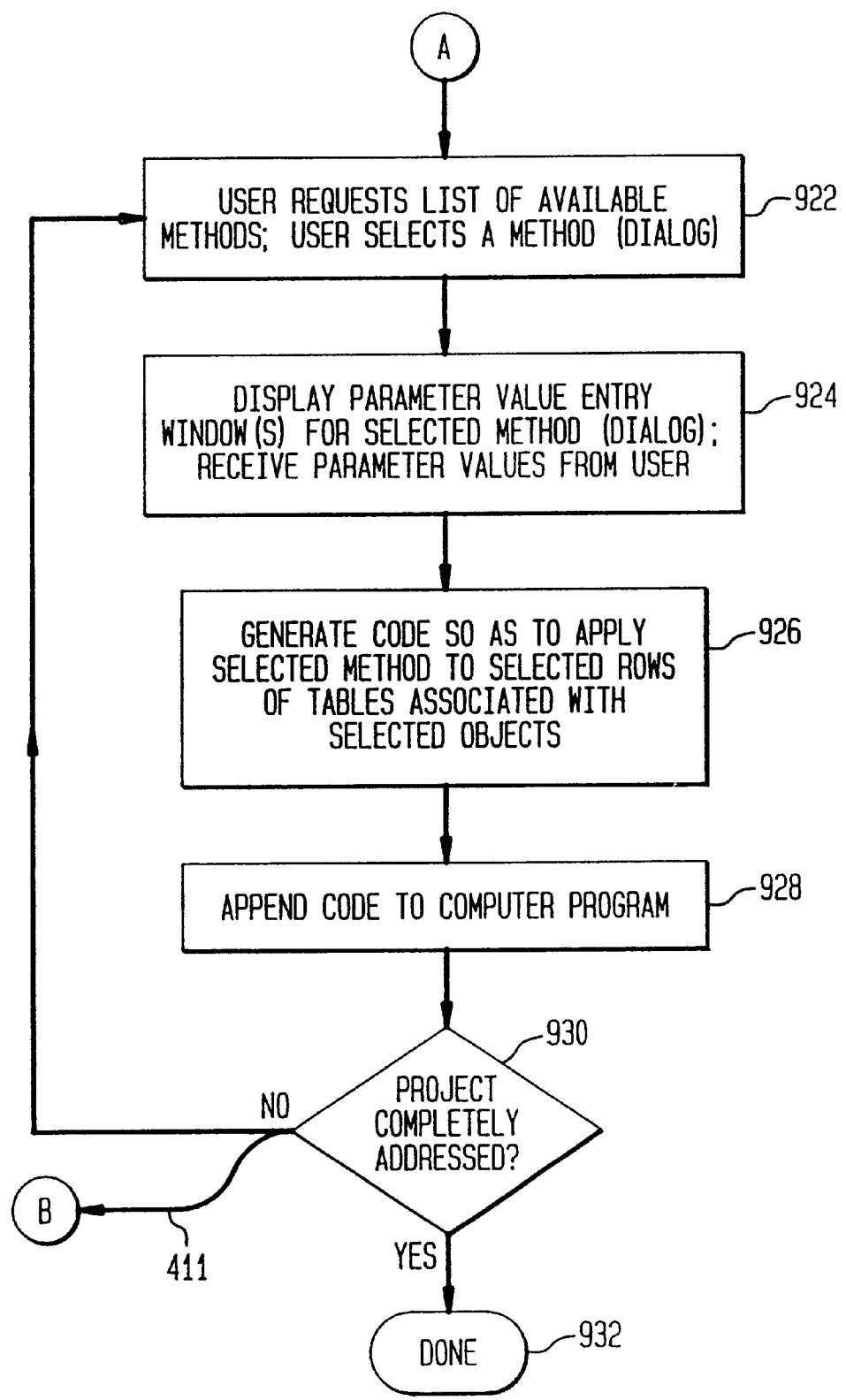

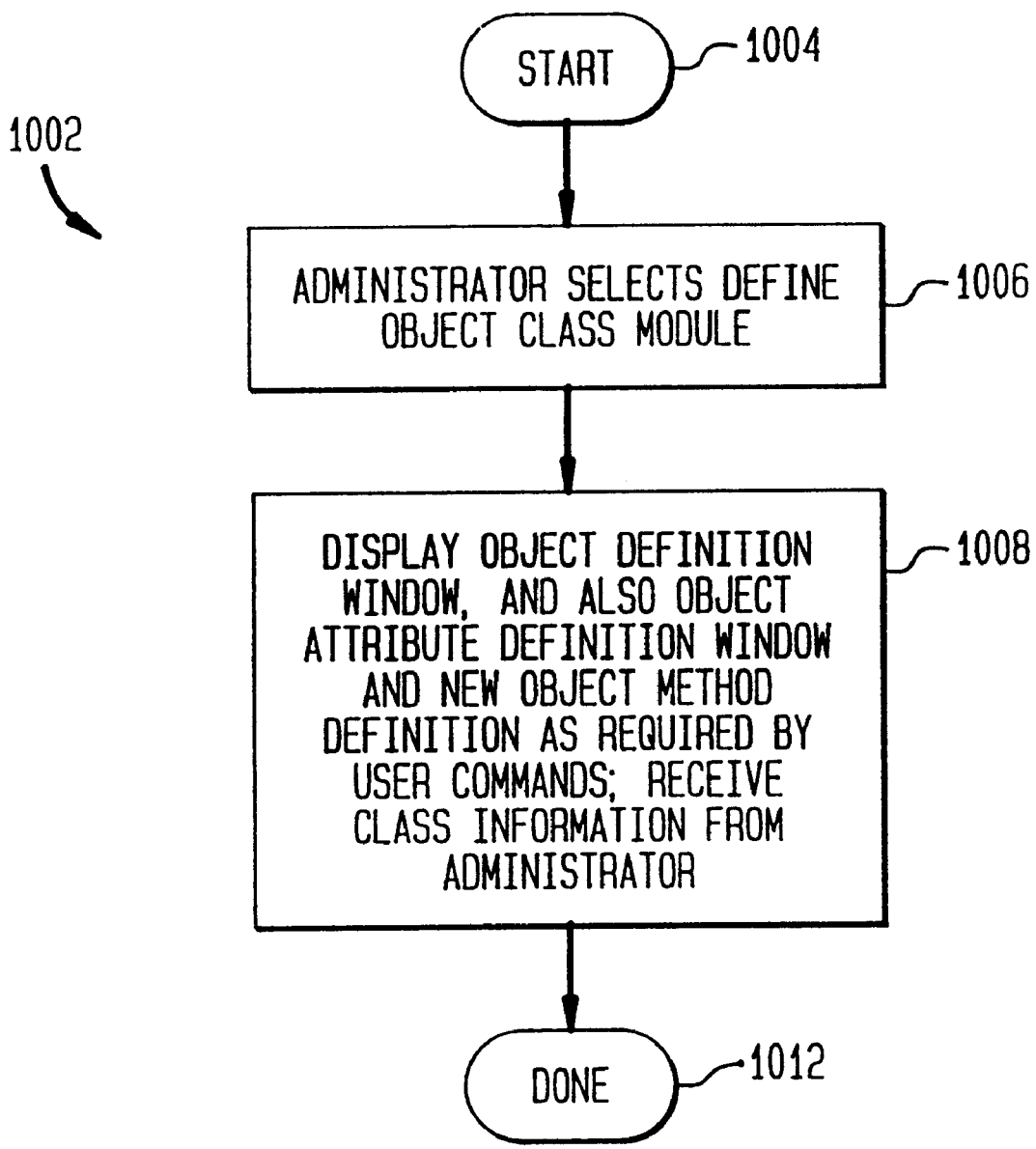

| DATASET NAME | VOLUME | SPACE |
|---|---|---|
|  |  |  |
|  |  |  |
|  |  |  |
|  |  |  |

1510

COMPUTER PROGRAM PRODUCT FOR ENABLING THE CONSTRUCTION OF DIALOGS FOR COMMANDS AND TEMPLATES

CROSS REFERENCE TO RELATED APPLICATIONS

The following applications of common assignee contain some common disclosure, and are believed to have an effective filing date identical with that of the present application.

"System and Method for Constructing Dialogs for Commands and Templates," appln. Ser. No. 08/464,534, incorporated herein by reference.

"System and Method for Constructing Computer Programs Using Dialogs and Objects," appln. Ser. No. 08/462,427, incorporated herein by reference.

"A Computer Program Product for Enabling the Construction of Computer Programs Using Dialogs and Objects," appln. Ser. No. 08/465,244, incorporated herein by reference.

BACKGROUND OF THE INVENTION

The present invention relates generally to the construction of computer programs (software), and more particularly to the construction of computer programs using dialogs and objects.

The generation of computer programs is complicated by a number of factors. One factor is the complexity of the syntax and structure of many computer programming languages. Another factor, which relates to a computer program that is intended to control a system (such software is called a system control program), is the complexity of the specification that defines the system. These complicating factors make it difficult for even the most experienced computer programmers to write computer programs, and almost impossible for less experienced programmers to write computer programs.

Consider, for example, a database system environment where periodic system maintenance must be performed to maintain system resources. Such system maintenance involves routine tasks (such as an off-line copy) and non-routine tasks (such as a database recovery operation). These routine and non-routine tasks are performed by generating and executing system control programs. The system control programs are written in an appropriate computer program language, such as Job Control Language (JCL).

The structure and syntax of JCL is complex and difficult to specify. Also, database system environments are often very complex. For example, if a task involved recovering fifty databases, then it would be necessary to know the attributes (such as the name, volume, space, etc.) for all of the databases, so as to construct the proper JCL computer program to perform the recovery task. The collection of such attribute information is very complex. These complexities make it difficult to construct system control programs.

Thus, what is required is a system and method for facilitating the construction of computer programs.

BRIEF SUMMARY OF THE INVENTION

Briefly stated, the invention is directed to a system and method for facilitating the construction of computer programs. The invention enables an administrator to define dialogs associated with commands from a computer programming language. According to the invention, users construct computer programs by using the dialogs. In particular, an user invokes a dialog, and then the invention generates code corresponding to a command associated with the invoked dialog. The code is in a form and has a syntax defined by the computer programming language. The code is inserted into the computer program being constructed.

The invention also provides for the construction of computer programs using dialogs and objects. In particular, a plurality of objects each corresponding to a resource in a target environment are defined and instantiated from a plurality of object classes. At least one of the dialogs is associated with each of the objects. An operator selects one or more of the objects (representing the resources in a system), and invokes a dialog associated with the selected objects. The invention generates code that, when executed, applies a command associated with the invoked dialog to each of the selected objects. The code is in a form and has a syntax defined by the computer programming language. This code is inserted in the computer program being constructed.

According to one embodiment, the invention is a computer program product (also called a program storage device) comprising computer readable medium having stored therein control logic. The control logic enables a computer to operate as indicated above, and as further described below.

Further features and advantages of the invention, as well as the structure and operation of various embodiments of the invention, are described in detail below with reference to the accompanying drawings. In the drawings, like reference numbers generally indicate identical, functionally similar, and/or structurally similar elements. The drawing in which an element first appears is indicated by the digit(s) to the left of the two rightmost digits in the corresponding reference number.

BRIEF DESCRIPTION OF THE DRAWINGS

The present invention will be described with reference to the accompanying drawings, wherein:

FIGS. 4, 5, 9A, 9B, 10, and 17 are flowcharts depicting the operation of the present invention;

FIG. 16 illustrates an example attribute table.

DETAILED DESCRIPTION

The present invention is a system and method for facilitating the construction of computer programs using dialogs for commands (from a computer programming language) and templates.

In an embodiment of the invention, JCL (Job Control Language) is used as the computer programming language, although other computer programming languages could alternatively be used. Also, the computer programs constructed by the invention represent system control programs, although other types of computer programs could alternatively be constructed. Generally speaking, the invention is useful for constructing computer programs where (1) the syntax and structure of the computer programming language are complex, and/or (2) the target environment (i.e., the computing environment in which the computer programs are to be executed) is complex. However, it should be understood that the invention can also be used to construct computer programs where neither (1) nor (2) is true.

An administrator (defined as a person experienced with the computer programming language and the target environment) generates a dialog for a command (called a command dialog) by specifying the format and the syntax of the command. The administrator generates a dialog for a template (called a template dialog) by specifying a group of command dialogs, where the commands associated with the command dialogs are collectively useful for performing a task.

An user (defined as a person less experienced with the computer programming language and/or the target environment) generates a computer program by invoking a command dialog associated with a command useful for performing a desired task. Upon invocation, the dialog interacts with the user to obtain parameter values necessary to execute the command. The command and parameter values are then automatically written to the computer program in the proper format and syntax. The user continues to invoke command and template dialogs until the computer program is complete. (It should be understood that the administrator could also invoke dialogs to construct computer programs.)

Figure 1:
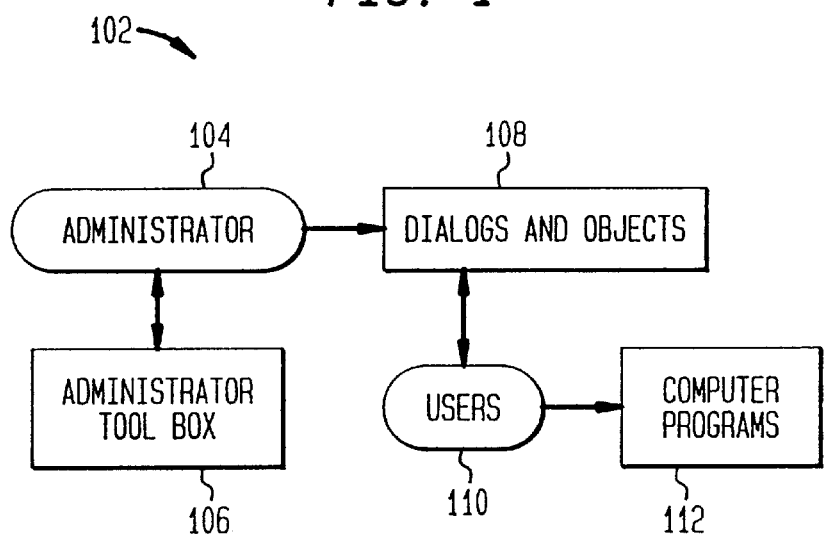
FIG. 1 generally illustrates the manner in which dialogs and objects are generated from an administrator tool box, and the manner in which such dialogs and objects are used to generate computer programs.

As shown in FIG. 1, the invention provides an administrator tool box 106 containing tools that an administrator 104 uses to generate dialogs and objects 108 (objects are described below). Users 110 utilize the dialogs to generate computer programs 112.

Accordingly, the users 110 do not have to have a detailed understanding of the computer programming language or the target environment in order to construct computer programs. Instead, the users 110 need only invoke dialogs to construct computer programs. Accordingly, the present invention facilitates the construction of computer programs. Additionally, since computer programs 112 are constructed by invoking dialogs (rather than by writing code directly), the invention promotes and enhances software reusability and standardization.

Figure 2:
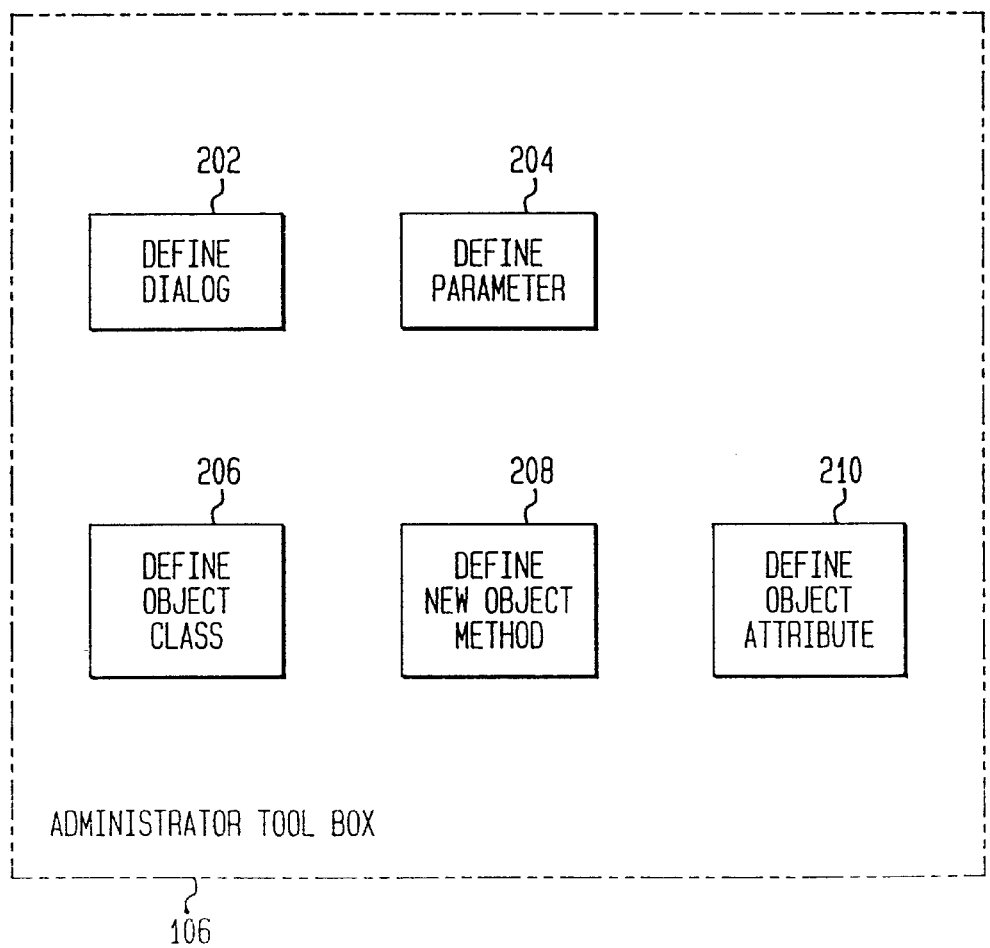
FIG. 2 is a block diagram of the administrator tool box according to a preferred embodiment of the invention.

FIG. 2 is a block diagram of the administrator tool box 106. The administrator tool box 106 includes a define dialog module 202, a define parameter module 204, a define object class module 206, a define new object method module 208, and a define object attribute module 210. These modules 202, 204, 206, 208, 210 represent tools that the administrator 104 can use to generate dialogs and objects 108. These modules 202, 204, 206, 208, 210 are preferably software modules/programs written in any well known and appropriate computer language. These modules 202, 204, 206, 208, 210 are further described below.

Figure 3:
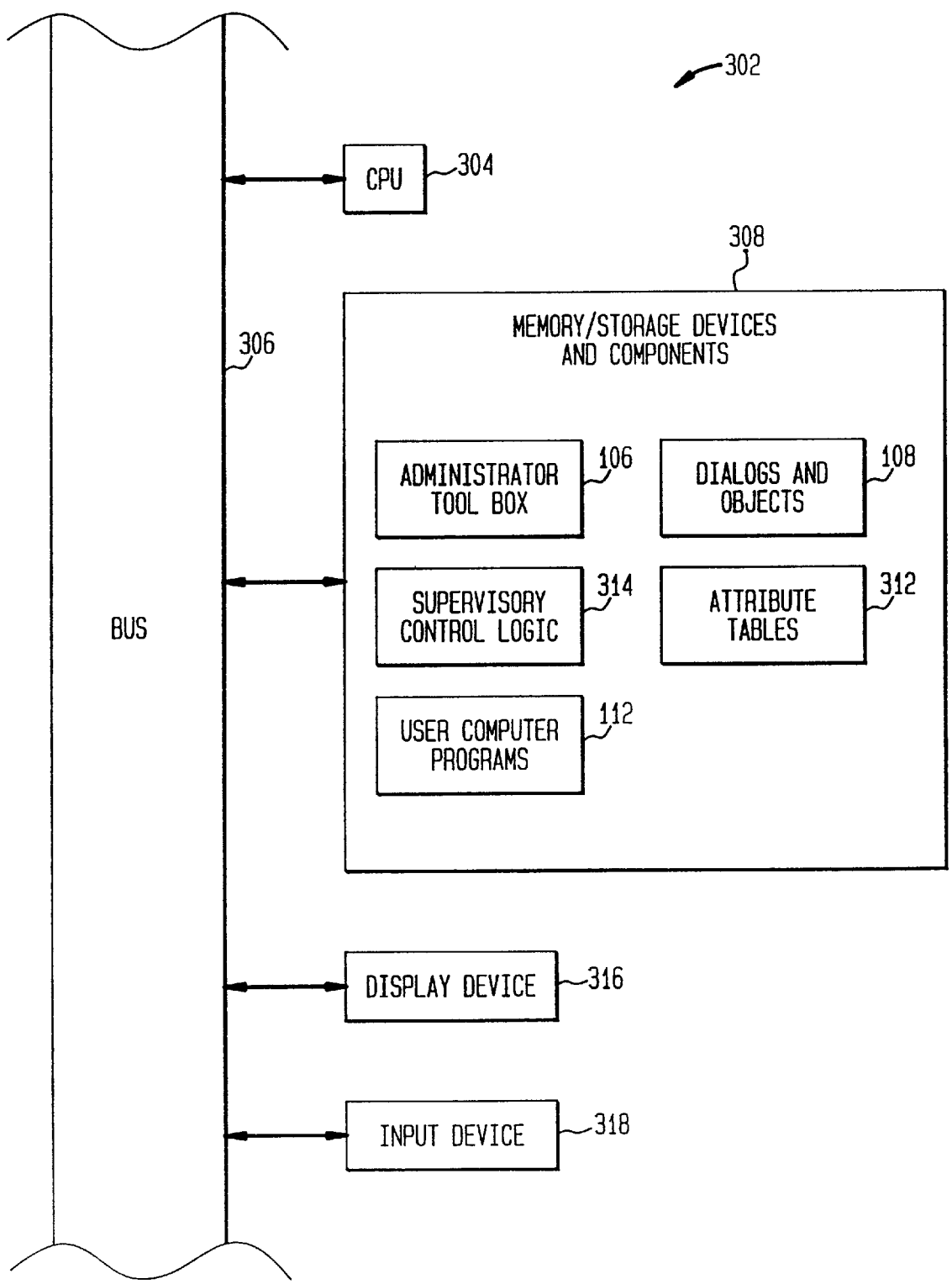
FIG. 3 is a block diagram of a preferred computer system of the present invention.

FIG. 3 is a block diagram of a computer system 302. This computer system 302 could be used by the administrator 104 to generate the dialogs and objects 108. This computer system 302 could also be used by the users 110 to generate computer programs 112 using the dialogs and objects 108 (alternatively, the administrator 104 and the users 110 could operate on different computer systems). The computer system 302 can be implemented using any suitable commercially available computer system.

The computer system 302 includes one or more processors, such as CPU (central processing unit) 304, connected to a bus 306. Also connected to the bus 306 are a number of memory/storage devices and components 308 representing, for example, main memory RAM (random access memory), a hard drive, removable storage devices such as floppy drives, CD drives, and tape drives, and computer program products such as computer storage disks, compact disks, optical disks, magnetic tapes, etc. Such computer program products have computer readable mediums with data and control logic (software) recorded thereon.

Stored in the memory/storage devices and components 308 are the administrator tool box 106, the dialogs and objects 108, attribute tables 312, supervisory control logic 314, and user computer programs 112. These are described below.

The computer system 302 also includes a display device 316 (such as a monitor) and one or more input devices 318 (such as a keyboard, mouse, track ball, etc.).

Generating Computer Programs By Using Dialogs

Figure 4:
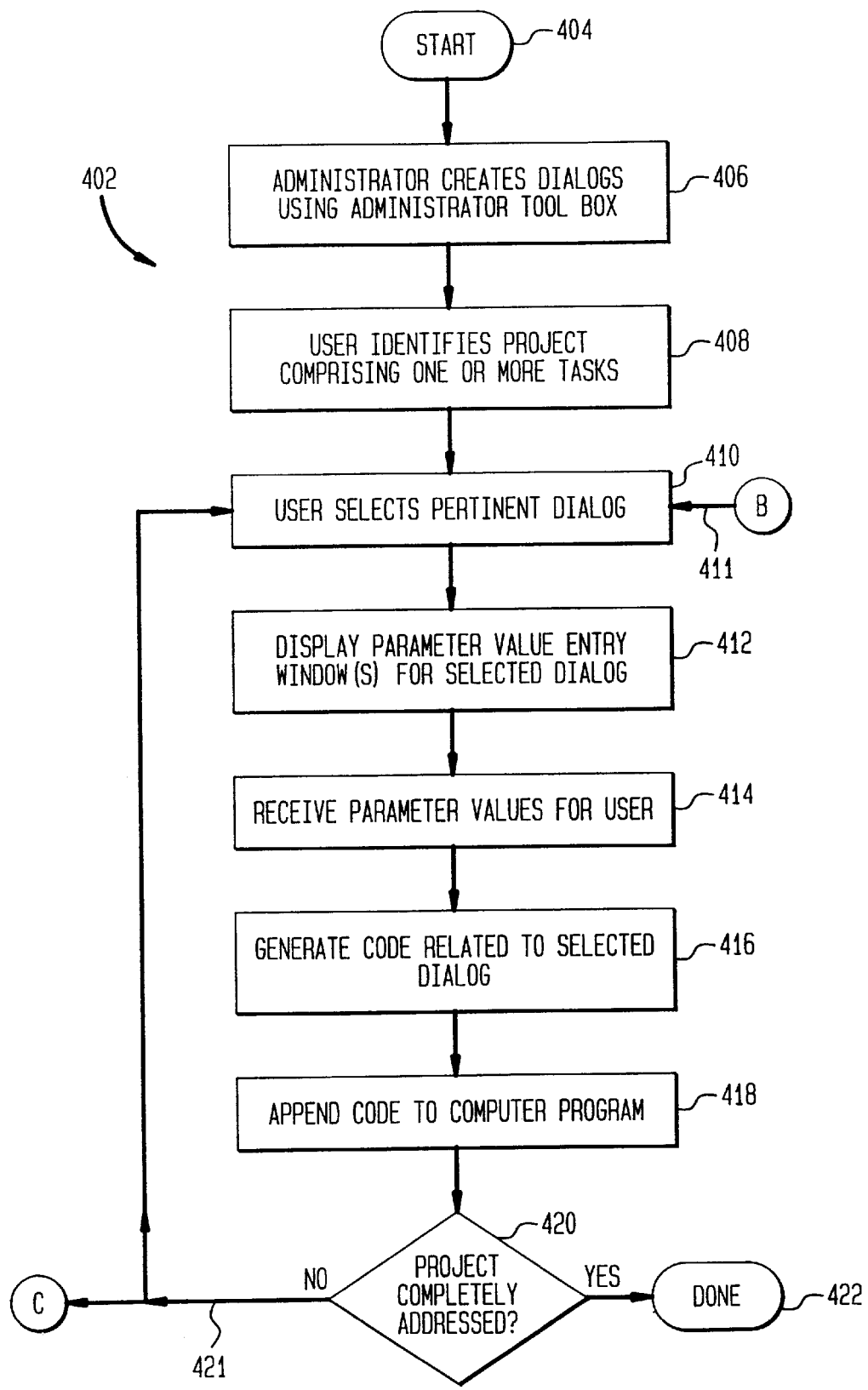

The manner in which a computer program 112 is constructed through the use of dialogs shall now be described in detail with reference to a flowchart 402 presented in FIG. 4. Flowchart 402 begins with step 404, where control immediately passes to step 406.

In step 406, the administrator 104 creates a plurality of dialogs using the tools in the administrator tool box 106. In practice, the administrator 104 creates a dialog for each task and/or function that may later form part of or all of a computer program 112. For example, in a database environment, the administrator 104 may create a dialog for an off-line image copy function, a dialog for a database recovery function, etc. It should be understood that the creation of dialogs by the administrator 104 is preferably an ongoing process. Over time, in response to requests from users 110, for example, new dialogs are created, and old dialogs are modified and/or deleted. Accordingly, the performance of step 406 occurs repeatedly over time, and not necessarily in the order shown in FIG. 4.

Figure 5:
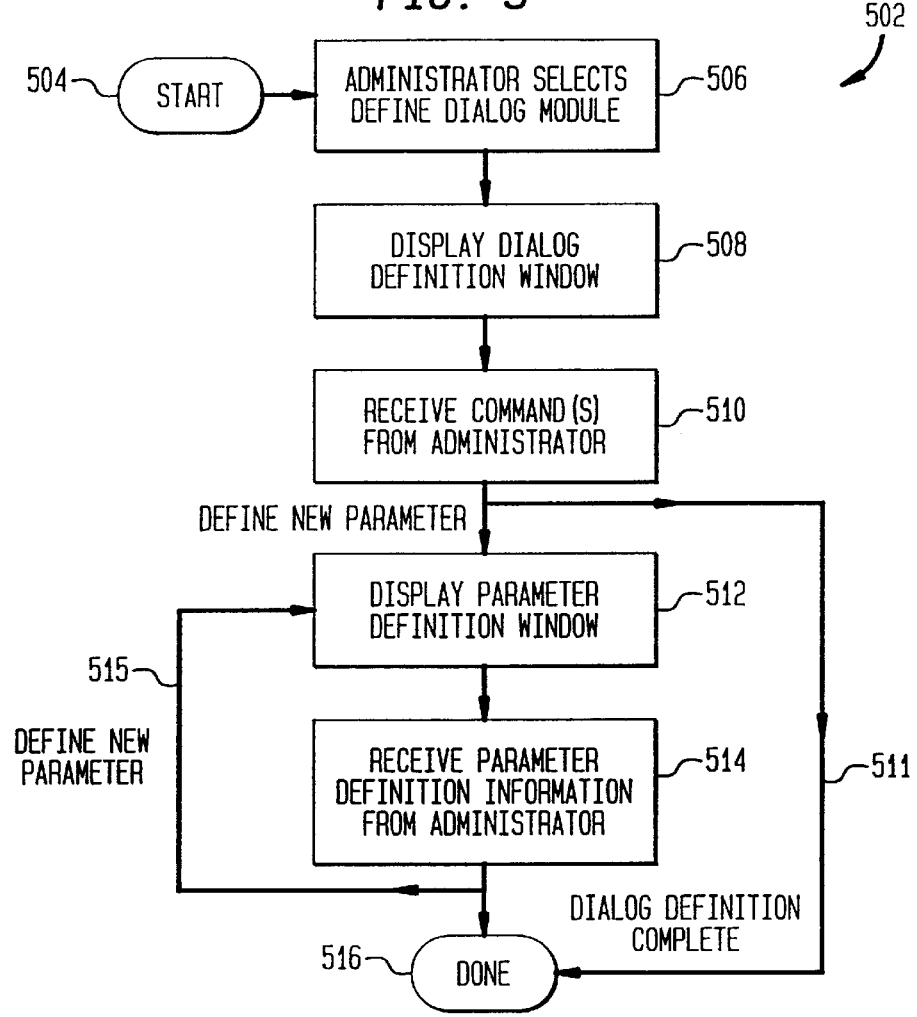

Step 406 shall now be described in greater detail with reference to a flowchart 502 in FIG. 5, which depicts the manner in which a single dialog for a command is defined. Flowchart 502 is performed for each command dialog that the administrator 104 wishes to define. Flowchart 502 begins with step 504, where control immediately passes to step 506.

In step 506, the administrator 104 indicates that he wishes to interact with the define dialog module 202. The administrator 104 preferably does this by invoking the define dialog module 202 in any well known manner, such as by selecting (with a pointing device, for example) an icon corresponding to the define dialog module 202. It is noted that the user interface functionality described in this paragraph (i.e., displaying the icon corresponding to the define dialog module 202, and responding to an user command via a pointing device to invoke the define dialog module 202) is provided by the supervisory control logic 112 in a well known manner.

Figure 6:
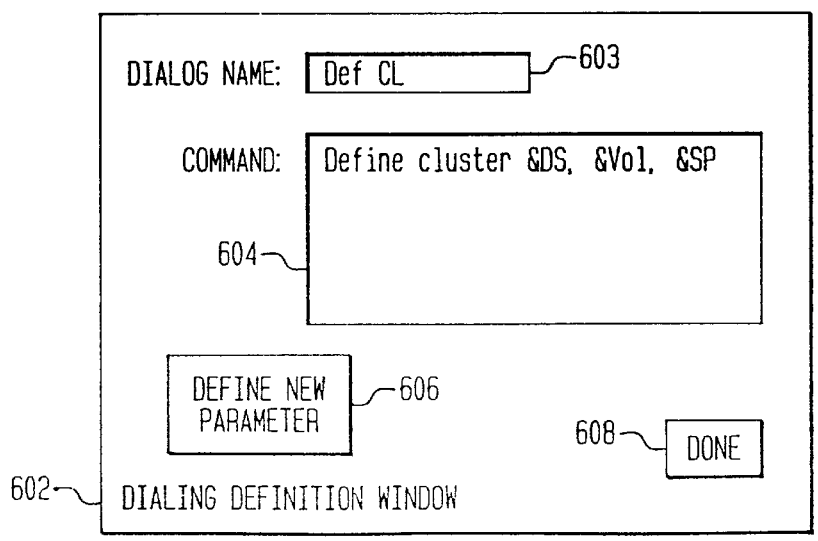
FIGS. 6, 7, 8, 11, 12, and 13 are exemplary windows used by the invention to interact with administrators and users.

In step 508, the define dialog module 202 displays a dialog definition window 602 as shown in FIG. 6. The dialog definition window 602 includes a dialog name field 603 in which the administrator 104 can enter the name of the dialog being defined, a command field 604 in which the administrator 104 may enter the format/syntax of one or more commands (the format/syntax for each command is also called a command string), a define new parameter button 606 which the administrator 104 may press in a well known manner to define a parameter of the command, and a done button 608 which the administrator 104 may press in a well known manner once the command has been completely defined.

In step 510, the define dialog module 202 receives from the administrator 104 the format/syntax for one or more commands. These commands are displayed in the command field 604. These commands are from the computer programming language of the computer program 112 being constructed. Thus, if the computer programming language is JCL, then these commands would be from the JCL computer programming language. In the example shown in FIG. 6, the define dialog module 202 in step 510 received from the administrator 104 the format/syntax of the "define cluster" command.

This command has three parameters, denoted by &DS, &Vol, and &SP in the command field 604 (these are each also called a parameter string). However, the administrator 104 has not yet defined these parameters. The administrator 104 defines a parameter by pressing the define new parameter button 606, at which time the define parameter module 204 is invoked. The define parameter module 204 performs step 512. (Note that, if the command does not have any parameters, then control moves to step 516 as indicated by control line 511. In practice, control flows to step 516 after receiving an appropriate command from the administrator 104, such as when the administrator 104 presses the done button 608. Step 516 is described below.)

Figure 7:
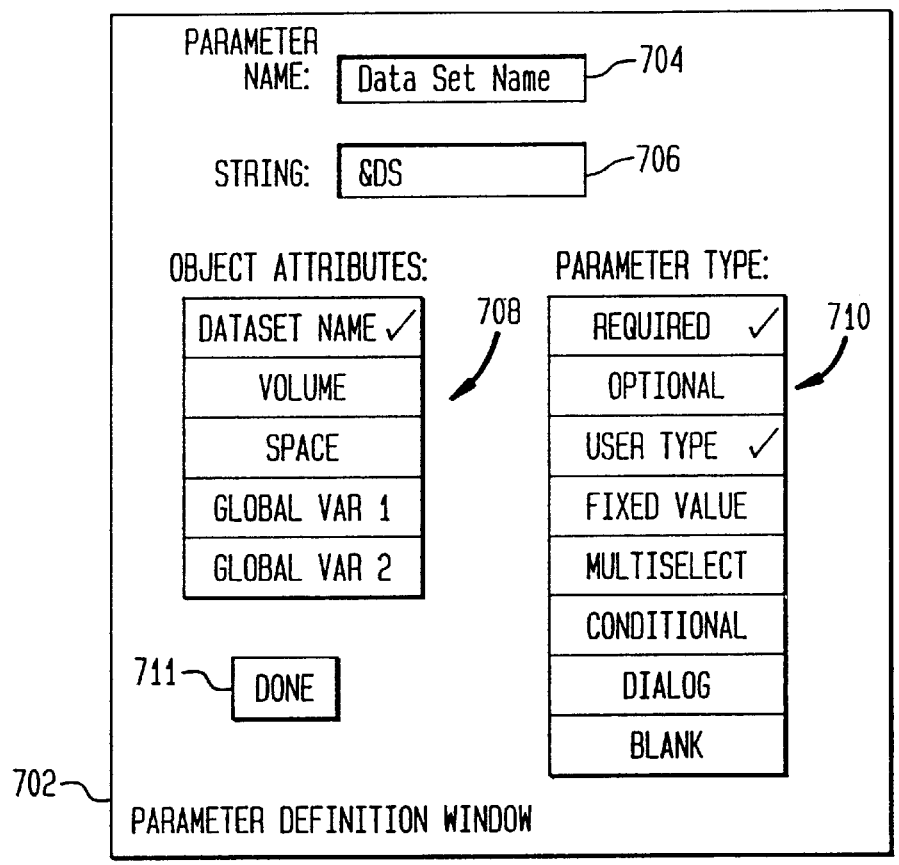

In step 512, the define parameter module 204 displays a parameter definition window 702 as shown in FIG. 7. The parameter definition window 702 has a parameter name field 704 in which the administrator 104 may enter the name of the parameter being defined, a string field 706 in which the administrator 104 may enter a string denoting the manner in which the parameter is represented in the command in question (i.e, the command displayed in the command field 604 of the dialog definition window 602), an object attributes field 708 in which the administrator 104 may indicate the object attribute that applies to the parameter (if any), a parameter type field 710 in which the administrator 104 may indicate the parameter type(s) of the parameter, and a done button 711 which the administrator 104 may press after the parameter has been completely defined.

In step 514, the define parameter module 204 receives from the administrator 104 parameter definition information, and displays this parameter definition information in the appropriate fields of the parameter definition window 702. In the example of FIG. 7, the parameter being defined is the Data Set Name parameter as shown in the parameter name field 704. This parameter is represented by the string "&DS" in the command in question (see the command field 604 in FIG. 6), as indicated in the string field 706. The administrator 104 has indicated that this parameter represents a "dataset name" object attribute, as indicated by the check mark beside the "dataset name" entry in the object attributes field 708 (object attributes are discussed in greater detail below). The administrator 104 has also indicated that this parameter is a required user type parameter, as indicated by the check marks next to the "Required" and "User Type" entries in the parameter type field 710. Before proceeding further, it will be useful to discuss the preferred parameter types supported by the invention.

A required parameter (indicated by selecting the "Required" entry in the parameter type field 710) is one whose value must be provided by the user 110 when the associated dialog is invoked. An optional parameter (indicated by selecting the "Optional" entry in the parameter type field 710) is one whose value may be, but need not be, provided by the user 110 when the associated dialog is invoked.

A user type parameter (indicated by selecting the "User Type" entry in the parameter type field 710) is one whose value must be entered by the user 110 when the associated dialog is invoked. Preferably, when the dialog is invoked, the invention displays a conventional edit box to enable the user 110 to enter the value.

A fixed value parameter (indicated by selecting the "Fixed Value" entry in the parameter type field 710) is one that may only have a certain set of possible values. The administrator 104 must provide these values when the parameter is being defined. These values are displayed when the dialog is invoked, and the user 110 is required to select one of these values.

A multiselect parameter (indicated by selecting the "Multiselect" entry in the parameter type field 710) is one that can have multiple values. These values are entered by the user 110 (each value being separated by a delimiter, such as a comma or a semi-colon) when the dialog is invoked.

A conditional parameter (indicated by selecting the "Conditional" entry in the parameter type field 710) is one whose existence is conditional on the state of another parameter. The value for the conditional parameter is only entered by the user 110 if the condition is satisfied. Likewise, the conditional parameter only affects the execution of the command if the condition is satisfied. For example, supposes there are parameters P1 and P2. P2 can be defined to be conditional on whether or not a value of P1 is provided (in the case where P1 is an optional parameter). As another example, P2 can be defined to be conditional on whether or not P1 is equal to a certain value.

Some commands or templates may include other commands or templates in their representation. This represents an additional flexibility of the invention. This capability is achieved by the invention by the use of dialog parameters. A dialog parameter (indicated by selecting the "Dialog" entry in the parameter type field 710) is one whose value identifies another dialog. The command or template associated with this other dialog becomes embedded in the command in question.

The invention is not limited to the parameter types discussed above. Other parameter types will be apparent to persons skilled in the relevant art(s).

The dialog definition window 602 is redisplayed after all parameter definition information has been entered by the administrator 104 and received by the define parameter module 204 in step 514. In practice, this occurs after the administrator 104 has pressed the done button 711 in the parameter definition window 702. At this point (i.e., after the administrator 104 has pressed the done button 711 and the dialog definition window 602 has been redisplayed), the administrator 104 may define another parameter of the command in question by again pressing the define new parameter button 606 (at which time control returns to step 512 as indicated by control line 515). In practice, the administrator 104 presses the define new parameter button 606 once for each parameter of the command in question, so as to define each parameter.

If the administrator 104 has completed the definition of the dialog, then the administrator 104 presses the done button 608 in the dialog definition window 602. Processing of flowchart 502 is then complete as indicated by step 516.

Information pertaining to this new dialog is saved, preferably as a record in a relational database table, for later access and processing. A dialog has been completely defined once its format/syntax has been defined, and once all of its parameters have been defined.

As indicated above, flowchart 502 represents the operation of the invention when defining a dialog for a command. The manner in which a dialog for a template is defined is similar to that shown in flowchart 502. However, when defining a template dialog, the define dialog module 202 in step 510 receives information from the administrator 104 that specifies one or more existing dialogs for inclusion in the new dialog being created. (When the new template dialog is invoked, each of the dialogs which form part of the new template dialog will be invoked in turn.) Template dialogs can also have their own parameters, in which case steps 512 and 514 are performed.

Referring again to FIG. 4, the user 110 performs steps 408–422 to construct a computer program 112 using dialogs. The user 110 uses the dialogs constructed by the administrator 104 in step 406 to construct this computer program 112. Steps 408–422 shall now be described.

In step 408, the user 110 identifies a project or job that must be performed. The project may be to recover a database, or to perform an off-line edit, for example. The project may include one or more tasks. In steps 410–422, the user 110 uses the dialogs to construct a computer program 112 to perform this project.

Specifically, in step 410, the user 110 selects (from a catalog, for example) a dialog that is pertinent to the project. For example, the selected dialog may correspond to a command that, when executed, performs one of the tasks of the project.

In step 412, the invention displays a parameter value entry window 802 (FIG. 8) that corresponds to the selected dialog and, more particularly, that corresponds to the command associated with the selected dialog (the display and the user interaction with the parameter value entry window 802 may be controlled by the supervisory control logic 314, for example). The parameter value entry window 802 has a field for each parameter of the command. The user 110 is able to enter values for these parameters in these fields.

For example, suppose that the selected dialog corresponds to the "Define cluster" command (the definition of which is shown in FIG. 6). This command has three parameters, &DS, &Vol, and &SP. The example parameter value entry window 802 shown in FIG. 8 corresponds to this dialog. Accordingly, the parameter value entry window 802 includes fields for these parameters, i.e., a data set name field 804 for parameter &DS, a volume field 806 for parameter &Vol, and a space field 808 for parameter &SP. The format and content of these fields correspond to the parameter types of these parameters. For example, if a parameter is defined as being a user type, then an edit box is presented. If a parameter is defined as being a fixed value parameter, then a list of possible values is presented. The user 110 enters values for the parameters into these fields 804, 806, 808.

In step 414, the invention (in particular, the supervisory control logic 314) receives these parameter values from the user 110.

In step 416, the invention (in particular, the supervisory control logic 314) generates code representative of the selected dialog and the user-provided parameter values. The code is in the computer programming language of the computer program 112 being generated. Also, the code is in the proper format and syntax as defined and required by the computer programming language.

The invention preferably performs step 416 by retrieving the command string that was displayed in the command field 604 of the dialog definition window 602, and then replacing the parameter strings in this command string with the parameter values provided by the user 110. For example, suppose that the selected dialog corresponds to the define cluster command, and that in step 414 the user entered DSN1 for the Data Set Name parameter, V1 for the Volume parameter, and SP1 for the Space parameter. In step 416, the invention preferably retrieves the following command string that represents the define cluster command (refer to FIG. 6):

Define cluster &DS, &Vol, &SP

There are three parameter strings in this command string: &DS, &Vol, and &SP. The invention replaces these parameter strings with the user-provided parameter values, to thereby generate the following code:

Define cluster DSN1, V1, SP1

This code is in the computer programming language of the computer program 112 being generated, and is in the proper format and syntax as defined and required by the computer programming language. Note, however, that the user 110 did not have to have a detailed understanding of the computer programming language in order to generate this code. Instead, the user 110 generated this code simply by invoking the appropriate dialog and providing the parameter values.

In step 418, the invention (preferably the supervisory control logic 314) adds the code to the computer program 112 being generated. In one embodiment, the invention appends the code to the computer program 112, although the user 110 may indicate other ways for inserting the code into the computer program 112.

In step 420, the user 110 determines whether the project identified in step 408 has been completely addressed by the computer program 112. If the project has not been completely addressed, then control flows back to step 410 to enable the user 110 to continue to generate the computer program 112 (alternatively, control flows along control line 421, which is described below). Otherwise, generation of the computer program 112 is complete, and flowchart 402 terminates, as indicated by step 422.

Generating Computer Programs By Applying Dialogs to Objects

According to the present invention, it is possible to define and instantiate objects that represent system components and resources. Once defined and instantiated, objects can be grouped together to represent the resources in a specific system. Dialogs may then be applied to any subset of these objects, to thereby generate a computer program 112 having code that, when executed, operates with the resources associated with the objects. Accordingly, this aspect of the invention represents another way for generating computer programs 112. The generation of computer programs 112 through the use of dialogs and objects shall now be further described with reference to a flowchart 902 in FIGS. 9A and 9B. Flowchart 902 begins with step 904, where control immediately passes to step 906.

In step 906, the administrator 104 creates a plurality of object classes using the tools in the administrator tool box 106. In practice, the administrator 104 creates an object class for each type of resource/component of interest in the target environment. For example, suppose that a business environment includes a plurality of payroll databases each having the same attributes. In this case, the administrator 104 may create an object class to represent such payroll databases. The business environment may also include a plurality of database logs, a plurality of personnel databases, and a plurality of image copies. In this case, the administrator 104 may create an object class to represent the database logs, another object class to represent the personnel databases, and another object class to represent the image copies.

It should be understood that the creation of object classes by the administrator 104 is preferably an ongoing process. Over time, in response to requests from users 110, for example, new object classes are created, and old object classes are modified and/or deleted. Accordingly, the performance of step 906 occurs repeatedly over time, and not necessarily in the order shown in FIG. 9. Also, new objects can be created by means of inheritance from existing objects. The details of such object creation will be apparent to persons skilled in the relevant art(s) based, at least in part, on the discussion contained herein.

Note that the administrator 104 preferably performs both step 906, to create object classes, and step 406 (FIG. 4), to create dialogs. Thus, prior to performing step 908, a plurality of object classes and dialogs exist. The definition of object classes depends on the definition of dialogs, and vice versa. This is described below.

Step 906 shall now be described in greater detail with reference to a flowchart 1002 in FIG. 10, which depicts the manner in which a single object class for a system resource/component is defined. Flowchart 1002 is performed for each object class that the administrator 104 wishes to define. Flowchart 1002 begins with step 1004, where control immediately passes to step 1006.

In step 1006, the administrator 104 indicates that he wishes to interact with the define object class module 206. The administrator 104 preferably does this by invoking the define object class module 206 in any well known manner, such as by selecting (with a pointing device, for example) an icon corresponding to the define object class module 206. It is noted that the user interface functionality described in this paragraph (i.e., displaying the icon corresponding to the define object class module 206, and responding to an user command via a pointing device to invoke the define object class module 206) is provided by the supervisory control logic 112 in a well known manner.

Figure 11:
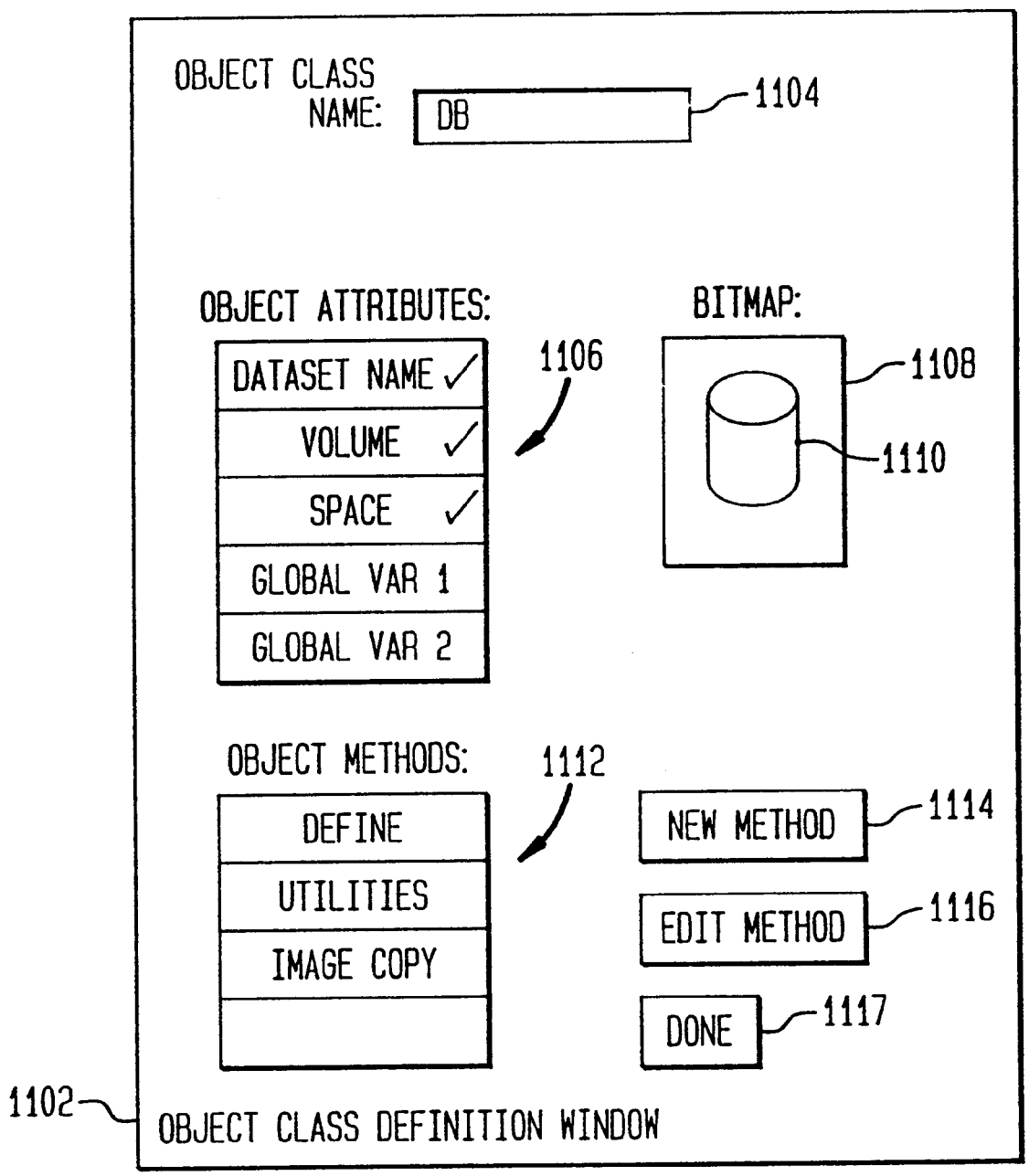

In step 1008, the define object class module 206 displays an object class definition window 1102 as shown in FIG. 11. The object class definition window 1102 includes an object class name field 1104 in which the administrator 104 can enter the name of the object class being defined, an object attributes field 1106 in which the administrator 104 can indicate which object attributes apply to the object class, a bitmap field 1108 in which the administrator 104 can select a bitmap (icon) to represent instantiations of the object class, an object methods field 112 that lists methods that apply to the object class, a new method button 1114 that the administrator 104 can press when he wishes to add a new method to the object methods field 112, an edit method button 1116 that the administrator 104 can press when he wishes to edit one of the methods in the object methods field 1112, and a done button 1117 that the administrator 104 can press when the object class has been completely defined.

Also in step 1008, the define object class module 206 receives from the administrator 104 object class definition information, and displays this information in the appropriate fields of the object class definition window 1102. In the example of FIG. 11, the object class being defined is called DB, as indicated in the object class name field 1104 (DB stands for database).

The administrator 104 has selected a bitmap 1110 that resembles a cylinder, as indicated in the bitmap field 1108.

The object attributes associated with object class DB are database name, volume, and space, as indicated by the check marks in the object attributes field 1106. This means that the system resources/components represented by the object class DB each has these three attributes.

In practice, the administrator 104 first identifies the attributes associated with the system resources/components in question (i.e., the system resources/components that are to be represented by the object class being defined). Then, the administrator 104 associates these attributes with the object class by selecting the corresponding entries in the object attributes field 1106.

The object attributes field 1106 lists all object attributes that are defined. If an attribute associated with the system resources/components does not have a corresponding entry in the object attributes field 1106, then the administrator 104 invokes the define object attribute module 210 (this is also part of step 1008). The define object attribute module 210 then displays an object attribute definition window 1202, as shown in FIG. 12.

The object attribute definition window 1202 includes an attribute name field 1204 in which the administrator 104 may enter the name of the attribute being defined, an object attribute check box 1206 where the administrator 104 can indicate whether this attribute is an object attribute, and a done button 1208 which the administrator 104 presses once the attribute has been completely defined.

Figure 12:
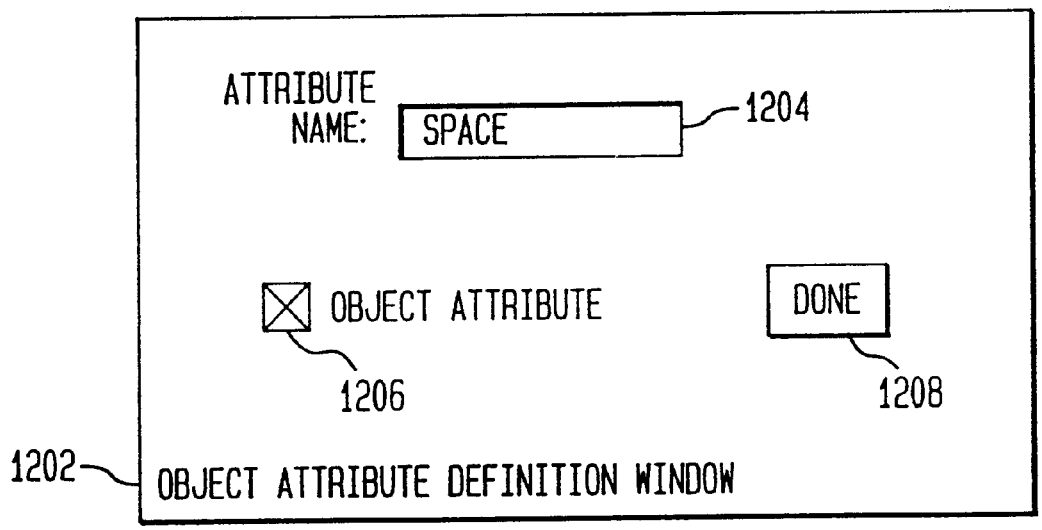

In the example of FIG. 12, the space attribute is being defined as indicated in the attribute name field 1204. This attribute is an object attribute, as indicated by the check in the object attribute check box 1206. If this box 1206 is not checked, then the attribute is a global variable (such as Global Var1 and Global Var2 in the object attributes field 1106 of FIG. 11), which is a variable that can be shared among multiple objects. After the administrator 104 presses the done button 1208, the attribute being defined (i.e., the space attribute) appears in the object attributes field 1106.

The object methods associated with the DB object class are define, utilities, and image copy. These methods are those that can be applied to instantiations (i.e., DB objects) of the DB object class. According to the present invention, an object method is a dialog. Thus, define, utilities, and image copy are dialogs that were previously defined by the administrator 104 in step 406 (FIG. 4). These dialogs can be applied to instantiations of the DB object class.

The administrator 104 associates a new method with the DB object class by pressing the new method button 1114 (this is also part of step 1008). This results in invoking the define new object method module 208.

Figure 13:
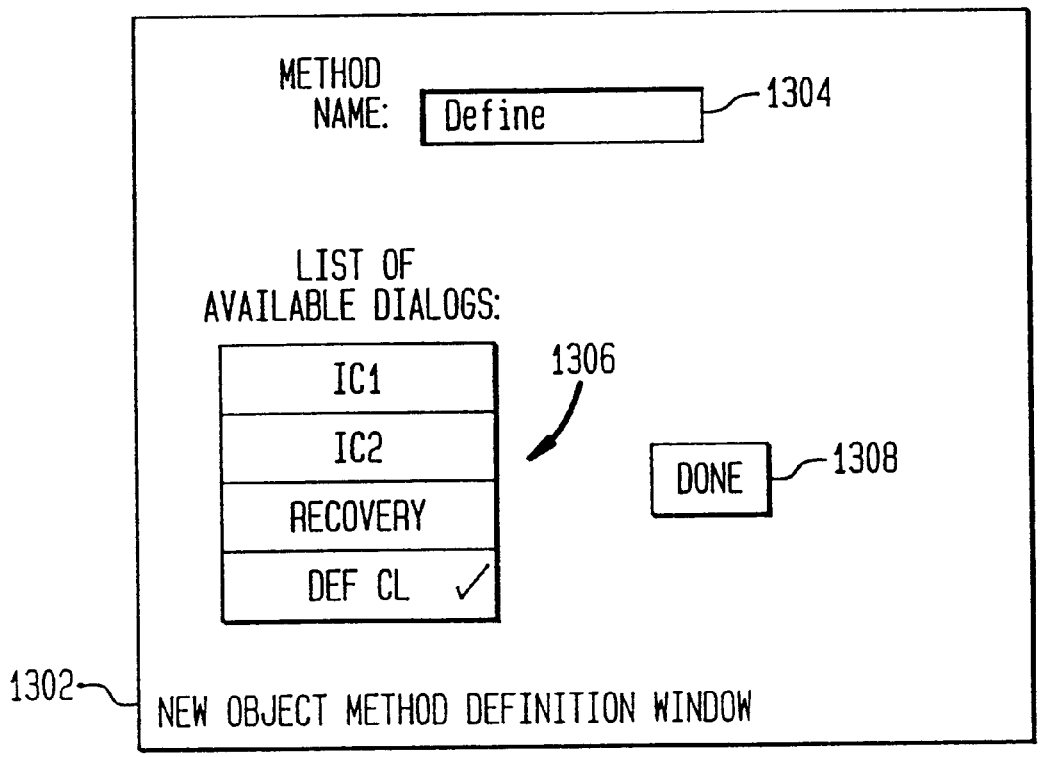

The define new object method module 208 displays a new object method definition window 1302, as shown in FIG. 13. The new object method definition window 1302 includes a method name field 1304 in which the administrator 104 can enter the name of the method being defined and associated with the object class, an available dialogs field 1306 in which the administrator 104 can select the dialog(s) to be associated with the method, and a done button 1308 that the administrator 104 can press once the new method has been defined.

In the example of FIG. 13, the define method is being defined, as indicated by the method name field 1304. The available dialogs field 1306 lists all dialogs presently defined (not all dialogs are shown in FIG. 13). The administrator 104 has indicated that dialog defcl (associated with the define cluster command, as shown in FIG. 6) should be associated with the define method. This is indicated by the check mark in the available dialogs field 1306. If a required dialog has not yet been defined, then the administrator 104 must define the dialog in the manner described above.

If the administrator 104 wishes to edit a method listed in the object methods field 1112 (FIG. 11), then the administrator 104 presses the edit method button 1116. A window such as the new object method definition window 1302 is then displayed. The administrator 104 can then select and edit a method via this window.

The administrator 104 presses the done button 1117 once the object class has been defined. At that time, the object class definition information for the object class are stored, preferably as a record in a relational database.

Referring again to FIG. 9A, step 908 is performed after the administrator 104 has defined all desired object classes in step 906. Before describing step 908, however, it will be useful to revisit the definition of a dialog and a parameter as shown in FIGS. 6 and 7, respectively. As noted above, the invention allows a method (i.e., a dialog) to be applied against an object. To accomplish this, the invention provides a mechanism to link a dialog with an object. One part of this linkage is the object methods field 1112. The object methods field 1112 in the example of FIG. 11 indicates that the DB object class is associated with the define, utilities, and image copy methods. With respect to the define method, note that this method is represented by the defcl dialog (FIG. 13). Thus, the DB object class is linked to the defcl dialog.

The invention provides additional linkage between dialogs and objects. Referring to FIG. 6, note that the define cluster command has three parameters: &DS, &Vol, and &SP. FIG. 7 illustrates the definition of the &DS (Data Set Name) parameter. Note that this parameter is indicated in the object attributes field 708 as being a dataset name object attribute. In FIG. 11, note that the DB object class has as one of its object attributes the dataset name object attribute. Thus, the DB object class and the Data Set Name parameter (&DS) have in common the dataset name object attribute. Accordingly, the DB object class and the Data Set Name parameter are linked by the dataset name object attribute. In particular, when the defcl dialog is invoked, values for the Data Set Name (&DS) parameter in the define cluster command are obtained from the dataset name attribute of instances of the DB object class (instead of being provided through execution time interaction with the user 110). This is further described below.

Referring again to FIGS. 9A and 9B, the user 110 performs steps 908–932 to construct a computer program 112 using dialogs and objects. Steps 908–932 shall now be described.

In step 908, the user 110 identifies a project or job that must be performed. The project may be to recover a database, or to perform an off-line edit, for example. The project may include one or more tasks. In steps 910416-932, the user 110 uses the dialogs and objects to construct a computer program 112 to perform this project.

In step 910, the user 110 determines whether all objects (i.e., instantiations of object classes) needed to perform the project have been instantiated. The user 110 preferably performs step 910 by identifying all of the resources/components in the target system that are needed to perform the project. The user 110 then determines whether an object has been instantiated for each of these resources/components. If an object has been instantiated for each of these resources/components, then step 920 is performed (described below). Otherwise, steps 912–918 are performed, wherein an object is instantiated for each resource/component that does not already have an object.

Specifically, in step 912 the invention (preferably the supervisory control logic 314) displays a list of all object classes currently defined. The user 110 selects an object class that represents one of the resources/components that does not already have an object (this is called the "current resource/component" for reference purposes). For illustrative purposes, assume that the current resource/component is a database, and that the selected object class is the DB object class.

In step 914, the user 110 provides a name for the object (called the "new object" for reference purposes) which the user 110 wishes to instantiate to represent the current resource/component. For illustrative purposes, assume that the user 110 calls this new object "Payroll3."

Figure 14:
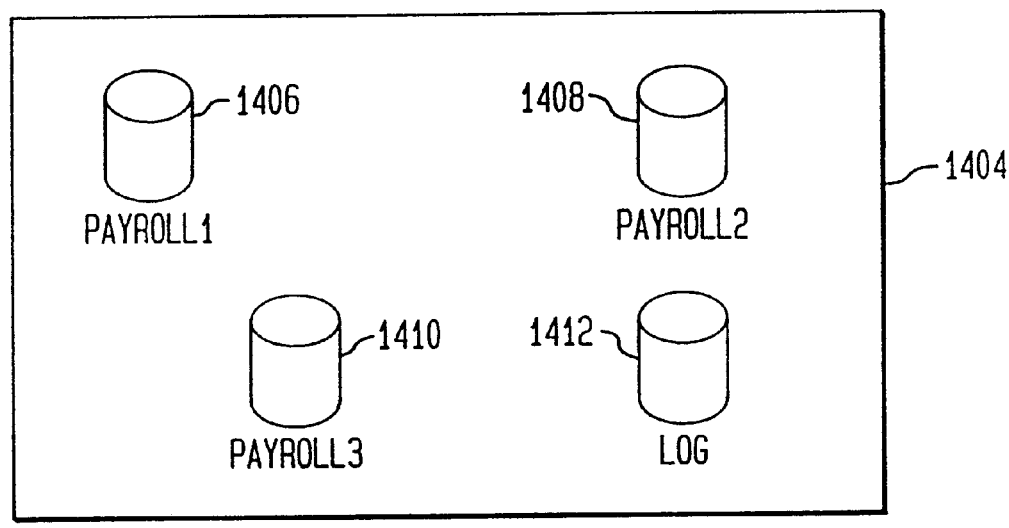
FIG. 14 illustrates an example display of bitmaps associated with objects.

In step 916, the invention (in particular, the supervisory control logic 314) displays the bitmap 1410 of object Payroll3. This is shown in FIG. 14. Note that objects Payroll1 and Payroll2 were previously created, and are also instantiations of the DB object class. The previously-created object called Log is an instantiation of a different object class.

Figure 15:
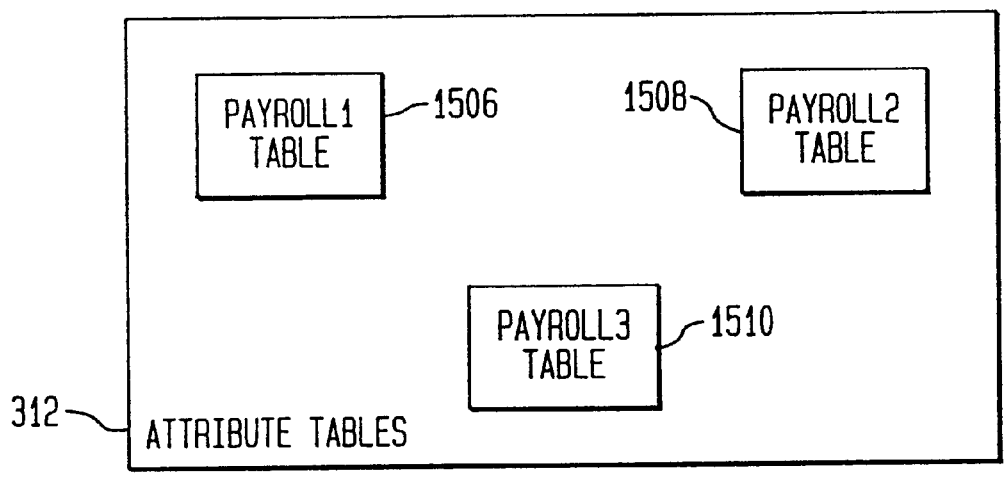
FIG. 15 illustrates attribute tables associated with the objects of FIG. 14.
Figures 16, 17:
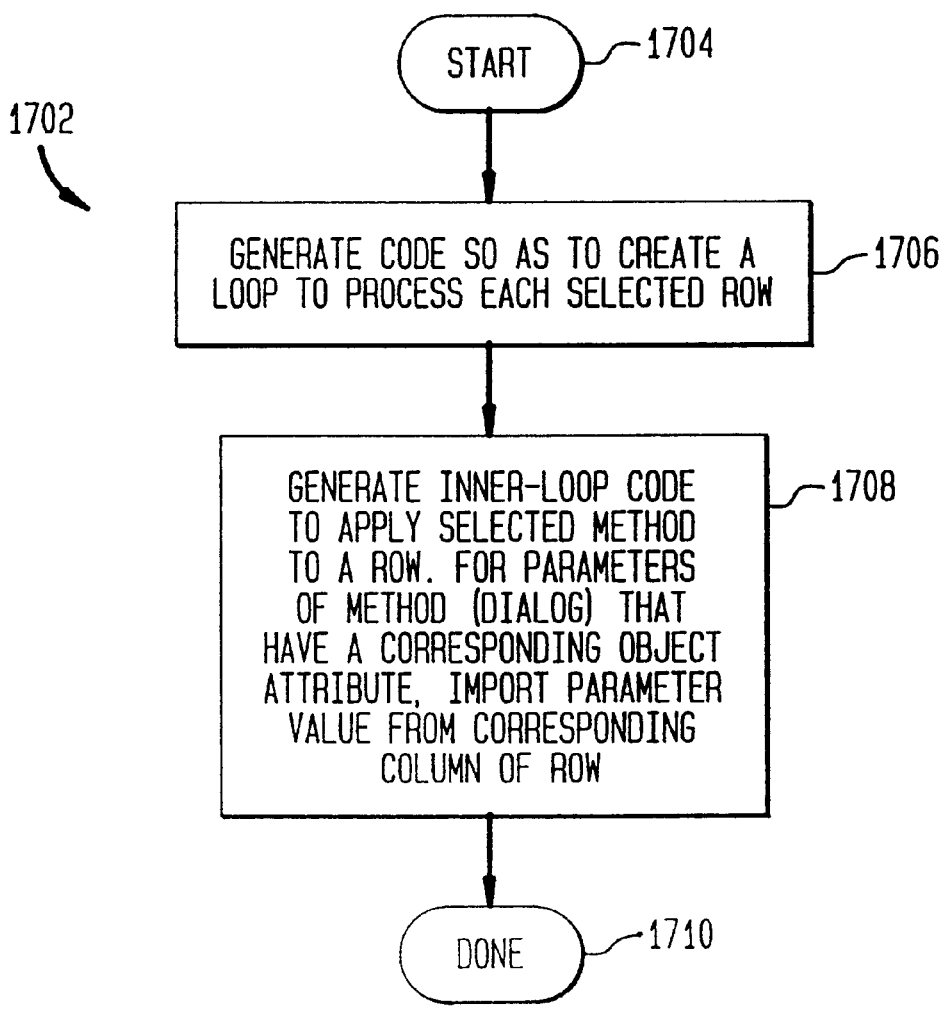

In step 918, the user 110 requests that the attribute table associated with object Payroll3 be displayed. According to the invention, associated with each object is an attribute table (these are shown as attribute tables 312 in FIG. 3). See FIG. 15. The attribute table for an object includes a column for each object attribute of the object's object class. FIG. 16 illustrates the attribute table 1510 for the object Payroll3, which is displayed pursuant to the user's 110 request in step 918. This attribute table 1510 includes a dataset name column, a volume column, and a space column, corresponding to the object attributes of the DB object class (see FIG. 11).

As will be appreciated, a database includes one or more datasets. Recall that the current resource/component is a database. Thus, the attribute table 1510 includes a row for each dataset associated with the Payroll3 object (and ultimately associated with the current resource/component). In step 918, the user 110 enters attribute values for each dataset in the current resource/component. If the current resource/component has 1000 datasets, then the user 110 would create 1000 rows in the attribute table 1510, and the user 110 would enter the dataset name, volume, and space of each dataset in the row corresponding to that dataset.

Control then returns to step 910, as indicated by control line 919. As discussed above, in step 910 the user 110 determines whether all objects needed to perform the project have been instantiated. If all such objects have been instantiated, then step 920 is performed. Step 920 shall now be described.

In step 920, the user 110 selects in a well known manner all objects pertinent to the project. The user 110 may do this, for example, by using a mouse in a well known manner to select each such object. Assume for illustrative purposes that the user 110 selects Payroll 1, Payroll 2, and Payroll 3.

In step 922, the user 110 requests a list of all methods associated with these selected objects. These objects are of class DB. Associated with class DB are the methods define, utilities, and image copy (see FIG. 11). Thus, pursuant to the user 110's request, a list specifying methods define, utilities, and image copy is displayed. The user 110 then selects one of these methods. Assume, for illustrative purposes, that the user 110 selects the define method. In effect, the user 110 is requesting that the invention generate code that, when executed, will apply the define method against objects Payroll1, Payroll2, and Payroll3.

Figure 8:
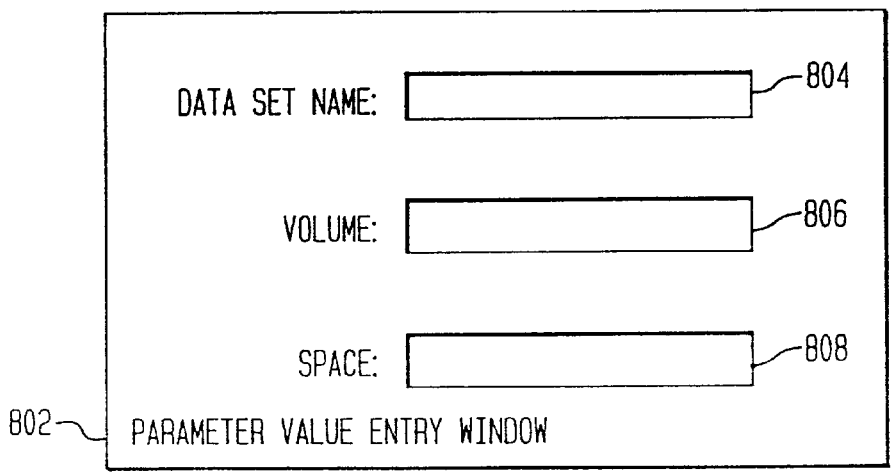

In step 924, the invention (in particular, the supervisory control logic 314) displays the parameter value entry window(s) for the selected method (recall that a method is a dialog). In this case, the parameter value entry window 802 shown in FIG. 8 is displayed. In this case, the user 110 need not enter any parameter value information, as this information will all be retrieved from the attribute tables associated with the objects Payroll1, Payroll2, and Payroll3. In some cases, however, there may be some parameters that will not be filled in using information from attribute tables. In such cases, the user 110 in step 924 supplies such parameter value information.

In step 926, the invention (in particular, the supervisory control logic 314) generates code so as to apply the selected method to the selected objects Payroll1, Payroll2, and Payroll 3. The code is in the computer programming language of the computer program 112 being generated. Also, the code is in the proper format and syntax as defined and required by the computer programming language.

The manner in which step 926 is performed is shown in a flowchart 1702 in FIG. 17. Flowchart 1702 begins with step 1704, where control immediately flows to step 1706.

In step 1706, the invention generates code so as to process each row of the attribute tables 1506, 1508, 1510 associated with the selected objects Payroll 1, Payroll 2, and Payroll 3. In another embodiment, the user 110 may select a subset of the rows from these attribute tables 1506, 1508, 1510, and the invention would then generate code so as to process each of these rows.

In step 1708, the invention generates inner-loop code to apply the selected method to a row. This code is generated such that values for parameters of the method are extracted from the row, where possible. Otherwise, parameter values entered by the user 110 in step 924 are used.

For example, the define method is implemented using the defcl dialog (FIG. 13), which corresponds to the define cluster command (FIG. 6). The define cluster command has three parameters, &DS, &Vol, and &SP. The &DS parameter is a dataset name object attribute (FIG. 7) that is linked to the dataset name column in the attribute tables 1506, 1508, 1510 (FIG. 16). Also, the &Vol parameter is a volume object attribute that is linked to the volume column in the attribute tables 1506, 1508, 1510, and the &SP parameter is a space object attribute that is linked to the space column in the attribute tables 1506, 1508, 1510 (these links are not explicitly shown in the drawings). Thus, in step 1708 the invention generates the code such that values for the &DS, &Vol, and &SP parameters in the define cluster command are retrieved from the rows of the attribute tables 1506, 1508, 1510.

Flowchart 1702 is complete after step 1708 is performed, as indicated by step 1710.

Referring again to FIG. 9B, in step 928 the invention (preferably the supervisory control logic 314) adds the code to the computer program 112 being generated. In one embodiment, the invention appends the code to the computer program 112, although the user 110 may indicate other ways for inserting the code into the computer program 112.

In step 930, the user 110 determines whether the project identified in step 908 has been completely addressed by the computer program 112. If the project has not been completely addressed, then control flows back to step 922 to enable the user 110 to continue to generate the computer program 112 (alternatively, control flows along control line 411, which is described below). Otherwise, generation of the computer program 112 is complete, and flowchart 902 terminates, as indicated by step 932.

Note that all of the selected objects in the above description were of the same object class. The present invention also supports the application of a method to objects of different classes. In this case, the selected dialog includes in its representation another dialog (using a Dialog type parameter). The selected dialog operates to process objects of one class. The other dialog operates to process objects of another class. This approach can be readily extended to process objects of more than two classes.

Figure 9A:
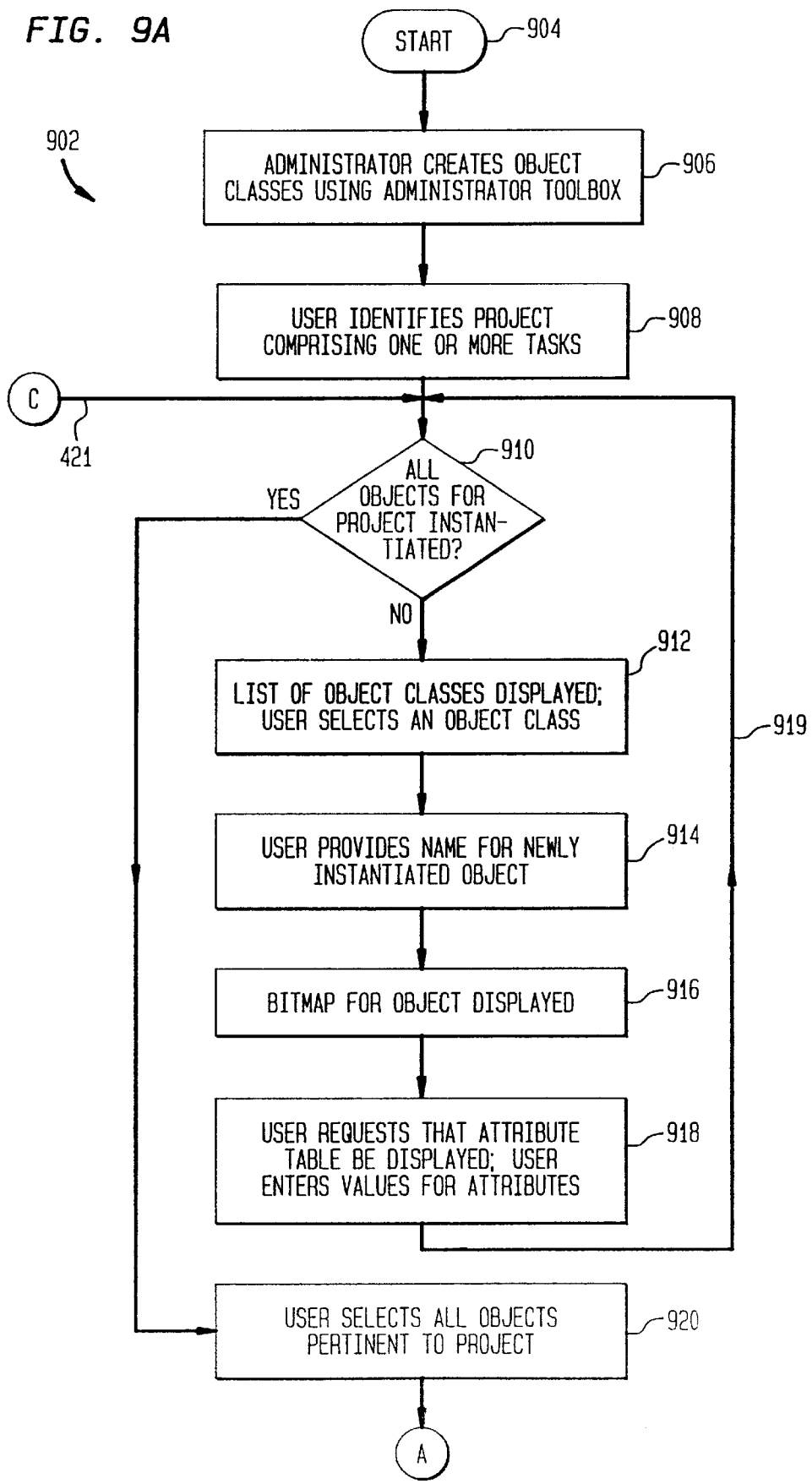

According to the invention, the user 110 may use either the dialogs alone to generate computer programs 112 (as described above with reference to FIG. 4), the dialogs applied to objects to generate computer programs 112 (as described above with reference to FIGS. 9A and 9B), or any combination of these. The interaction between flowcharts 402 and 902 in FIGS. 4, 9A, and 9B are indicated by control lines 411 and 421, although other connectivity between flowcharts 402 and 902, so as to provide users 110 will additional flexibility with using dialogs and objects to create computer programs 112, will be apparent to persons skilled in the relevant art(s).

It should be understood that, while in the above description some functions were described as being performed by an user, and others by an administrator, in practice any step can be performed by an administrator or an user, or by both. Accordingly, users and administrators are collectively referred to as operators herein.

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

What is claimed is:

1. A computer program product comprising a computer useable medium having computer program logic recording thereon for controlling a processor to enable the construction of computer programs using dialogs and templates, said computer program logic comprising:

a define dialog module for causing the processor to enable a first operator to define a plurality of dialogs using a first computer programming language, wherein each of said dialogs are defined to provide one or more commands in a second computer programming language, wherein each of said commands when executed in a computer causes the computer to perform a particular function; and a define parameter module for causing the processor to enable the first operator to define parameters for each of said commands that requires parameters;

wherein a second operator wishing to construct a computer program in said second computer programming language for execution on the computer selectively invokes said dialogs, wherein each of said dialogs, when invoked by the second operator, generates code corresponding to a command associated with said each of said dialogs, said code including any parameters of said command, said code being in a form and having a syntax defined by said second computer programming language, said code being inserted into the computer program being constructed.

2. The computer program product of claim 1, wherein said define dialog module comprises:

means for causing the processor to enable the first operator to provide a command string specifying a form and syntax of a command associated with said each dialog, said command string including a parameter string for each parameter of said command; and means for causing the processor to enable the first operator to define said each parameter, if any, of said command.

3. The computer program product of claim 1, further comprising:
   means for causing the processor to enable the first operator to define one or more template dialogs each associated with one or more of said dialogs associated with at least one command.

4. The computer program product of claim 1, wherein each of said parameters has a parameter type, wherein said parameter type is one of:
   (1) a required parameter;
   (2) a user type parameter;
   (3) a fixed value parameter;
   (4) a multiselect parameter; and
   (5) a conditional parameter.

5. The computer program product of claim 1, wherein said second computer programming language is a system control programming language.

6. The computer program product of claim 1, wherein said command dialogs are object methods associated with a plurality of object classes, each object class having one or more object attributes, wherein the first operator defines said plurality of object classes and instantiates objects as instances of said object classes, wherein the second operator selects said objects and provides values for each of said object attributes of said selected objects, and wherein said dialogs associated with selected objects are invoked, thereby causing said computer programming code from said second computer programming language to be generated and inserted into said computer program.

7. A program storage device readable by a machine, tangibly embodying a program of instructions executable by the machine to perform method steps for constructing a computer program, said method steps comprising:
   (1) defining a plurality of dialogs using a first computer programming language, each of said dialogs are defined to provide at least one command in a second computer programming language comprising the steps of:
      (a) providing a command string specifying a form and syntax of a command associated with a dialog being defined, said command string including a parameter string for each parameter of said command; and
      (b) defining said each parameter, if any, of said command;
   (2) instantiating a plurality of objects each corresponding to a resource in a target environment, at least one of said dialogs associated with each of said objects comprising the steps of:
      (a) defining a plurality of object classes each having one or more object attributes and one or more object methods, each object method corresponding to one of said dialogs; and
      (b) instantiating said objects as instances of said object classes;
   (3) providing values for object attributes for each of said selected objects;
   (4) selecting one or more of said objects;
   (5) invoking a dialog associated with said selected objects;
   (6) generating code that, when executed, applies a command associated with said invoked dialog to each of said selected objects using object attribute values for said selected objects, said code being in a form and having a syntax defined by said second computer programming language; and
   (7) inserting said code into the computer program.

8. The program storage device of claim 7, wherein said method steps further comprise the following step to be performed before step (1):
   defining a project including one or more tasks.

9. The program storage device of claim 7, wherein step (2) further comprises the following steps of:
   requesting a list of available methods for each of said instantiated objects; and
   selecting at least one method associated with said instantiated objects from said list.

10. The program storage device of claim 7, wherein step (2)(b) comprises the following steps of:
   (a) displaying a list of defined object classes;
   (b) establishing a name for a new object;
   (c) displaying a bitmap of said new object;
   (d) displaying an attribute table with one or more attributes associated with said new object;
   (e) establishing one or more attributes associated with said new object; and
   (f) repeating steps (a) to (e) until all objects for said project have been instantiated.

11. The program storage device of claim 7, wherein said each parameter has a parameter type, wherein said parameter type is one of:
   a required parameter;
   a user type parameter;
   a fixed value parameter;
   a multiselect parameter;
   an optional parameter; and
   a conditional parameter.

12. The program storage device of claim 7, wherein step (2)(b) comprises the following step of:
   indicating whether said each parameter is one of said object attributes.

13. The program storage device of claim 7, wherein said first computer programming language is an object oriented programming language and said second computer programming language is a system control programming language.

14. A method of constructing a computer program for use in an object oriented environment, comprising the steps of:
   (1) defining a plurality of dialogs using a first computer programming language, each of said dialogs are defined to provide at least one command in a second computer programming language, wherein said at least one command, when executed in a computer causes the computer, to perform a particular function associated with said at least one command, wherein said dialogs are invoked by an operator wishing to construct a computer program;
   (2) instantiating a plurality of object oriented objects each corresponding to a resource in a target environment, at least one of said dialogs associated with each of said objects;
   (3) selecting one or more of said objects;
   (4) invoking a dialog associated with said selected objects;
   (5) generating code that, when executed, applies a command associated with said invoked dialog to each of said selected objects, said code being in a form and having a syntax defined by said second computer programming language; and
   (6) inserting said code into the computer program being constructed by said operator.

15. The method of claim 14, wherein step (1) comprises the steps of:
- (a) providing a command string specifying a form and syntax of a command associated with a dialog being defined, said command string including a parameter string for each parameter of said command; and
- (b) defining said each parameter, if any, of said command.

16. The method of claim 15, wherein step (2) comprises the steps of:
- (I) defining a plurality of object classes each having one or more object attributes and one or more object methods, each object method corresponding to one of said dialogs; and
- (II) instantiating said objects as instances of said object classes.

17. The method of claim 16, wherein step (b) comprises the step of indicating whether said each parameter is one of said object attributes.

18. The method of claim 16, further comprising the following step that is performed between steps (2) and (3):
- providing values for object attributes for each of said selected objects.

19. The method of claim 18, wherein step (5) comprises the step of:
- generating code that, when executed, will apply said command associated with said invoked dialog against said selected objects using said object attribute values for said selected objects.

20. The method of claim 14, wherein said second computer programming language is a system control programming language.

21. A method of constructing a computer program, comprising the steps of:
- (1) defining one or more dialogs using a first computer programming languages, each of said one or more dialogs defined to provide at least one command from a second computer programming language, wherein said at least one command, when executed in a computer, causes the computer to perform a particular function associated with said at least one command, wherein said dialogs are invoked by an operator wishing to construct a computer program;
- (2) invoking one of said dialogs;
- (3) generating code corresponding to a command associated with said invoked dialog, said code being in a form and having a syntax defined by said second computer programming language; and
- (4) inserting said code into the computer program being constructed by said operator; wherein step (1) comprises the following steps that are performed for each dialog being defined:
  - (a) providing a command string specifying a form and syntax of a command associated with said each dialog, said command string including a parameter string for each parameter of said command; and
  - (b) defining said each parameter, if any, of said command; and wherein steps (3) and (4) comprise the steps of:
  - (a) providing values for parameters, if any, of said command associated with said invoked dialog;
  - (b) replacing parameter strings, if any, in a command string associated with said invoked dialog with said parameter values to thereby produce a modified command string; and
  - (c) inserting said modified command string into the computer program.

22. The method of claim 21, further comprising the step of:
- defining one or more template dialogs each associated with one or more of said dialogs associated with at least one command.

23. The method of claim 21, wherein the computer program performs a task, and logic underlying the task is at least partially specified by the command associated with the invoked dialog.

24. The method of claim 21, further comprising the following step that is performed before step (1):
- defining a project to be performed, wherein said project includes one or more tasks that are to be performed by code generated by invoking one or more of said dialogs.

25. The method of claim 21, wherein said first computer programming language is an object oriented programming language and said second computer programming language is a system control programming language.

* * * * *